US009632788B2

(12) United States Patent
Hall et al.

(10) Patent No.: US 9,632,788 B2
(45) Date of Patent: *Apr. 25, 2017

(54) BUFFERING INSTRUCTIONS OF A SINGLE BRANCH, BACKWARDS SHORT LOOP WITHIN A VIRTUAL LOOP BUFFER

(71) Applicant: International Business Machines Corporation, Armonk, NY (US)

(72) Inventors: Ronald Hall, Cedar Park, TX (US); Michael L. Karm, Cedar Park, TX (US); Brian R. Mestan, Austin, TX (US); David Mui, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,749

(22) Filed: Apr. 5, 2016

(65) Prior Publication Data

US 2016/0216970 A1 Jul. 28, 2016

Related U.S. Application Data

(63) Continuation of application No. 13/408,739, filed on Feb. 29, 2012, now Pat. No. 9,395,995, which is a
(Continued)

(51) Int. Cl.
*G06F 9/40* (2006.01)
*G06F 1/32* (2006.01)
(Continued)

(52) U.S. Cl.
CPC .......... *G06F 9/3802* (2013.01); *G06F 1/3234* (2013.01); *G06F 9/30196* (2013.01);
(Continued)

(58) Field of Classification Search
CPC ....... G06F 9/381; G06F 9/3814; G06F 1/3234
See application file for complete search history.

(56) References Cited

U.S. PATENT DOCUMENTS 5,579,493 A 11/1996 Kiuchi et al.
6,125,440 A 9/2000 Osovets
(Continued)

FOREIGN PATENT DOCUMENTS

EP 1107110 A2 6/2001

OTHER PUBLICATIONS

Huisman, David J., Restriction Requirement, U.S. Appl. No. 11/923,709, The United States Patent and Trademark Office, Aug. 26, 2010, pp. 1-6 (relevant pp. 1-6).
(Continued)

*Primary Examiner* — David J Huisman
(74) *Attorney, Agent, or Firm* — Yudell Isidore PLLC

(57) ABSTRACT

A method and system for instruction fetching within a processor instruction unit, utilizing a loop buffer, one or more virtual loop buffers, and/or an instruction buffer. During instruction fetch, modified instruction buffers coupled to an instruction cache (I-cache) temporarily store instructions from a single branch, backwards short loop. The modified instruction buffers may be a loop buffer, one or more virtual loop buffers, and/or an instruction buffer. The instruction fetch within the instruction unit of a processor retrieves the instructions for the short loop from the modified buffers during the loop cycles of the single branch, backwards short loop, rather than from the instruction cache.

20 Claims, 8 Drawing Sheets

Related U.S. Application Data continuation of application No. 11/923,709, filed on Oct. 25, 2007.

(51) Int. Cl.
*G06F 9/38* (2006.01)
*G06F 9/32* (2006.01)
*G06F 9/30* (2006.01)
*G06F 12/0875* (2016.01)

(52) U.S. Cl.
CPC .............. *G06F 9/325* (2013.01); *G06F 9/381* (2013.01); *G06F 9/3814* (2013.01); *G06F 9/3836* (2013.01); *G06F 12/0875* (2013.01); *G06F 2212/452* (2013.01)

(56) References Cited

U.S. PATENT DOCUMENTS

| | | | |
|---|---|---|---|
| 6,671,799 | B1 | 12/2003 | Parthasrathy |
| 6,748,523 | B1 | 6/2004 | Singh et al. |
| 6,766,444 | B1 | 7/2004 | Singh et al. |
| 6,820,194 | B1 | 11/2004 | Bidichandani et al. |
| 6,950,929 | B2 | 9/2005 | Chung et al. |
| 6,959,379 | B1 | 10/2005 | Wojcieszak et al. |
| 7,571,305 | B2 | 8/2009 | Piry et al. |
| 9,052,910 | B2 | 6/2015 | Hall |
| 9,395,995 | B2 | 7/2016 | Hall |
| 2003/0163679 | A1 | 8/2003 | Ganapathy et al. |
| 2004/0003298 | A1 | 1/2004 | Luick |
| 2005/0223172 | A1 | 10/2005 | Bortfeld |
| 2007/0113057 | A1 | 5/2007 | Knoth |
| 2007/0113059 | A1 | 5/2007 | Tran |
| 2008/0086621 | A1 | 4/2008 | Ogura |
| 2008/0294882 | A1 | 11/2008 | Jayapala et al. |
| 2009/0113191 | A1 | 4/2009 | Hall |

OTHER PUBLICATIONS

Huisman, David J., Non-Final Office Action, U.S. Appl. No. 11/923,709, The United States Patent and Trademark Office, Jan. 28, 2011, pp. 1-21 (relevant pp. 1-21).

Huisman, David J., Final Office Action, U.S. Appl. No. 11/923,709, The United States Patent and Trademark Office, Jun. 24, 2011, pp. 1-22 (relevant pp. 1-22).

Huisman, David J., Non-Final Office Action, U.S. Appl. No. 11/923,709, The United States Patent and Trademark Office, Aug. 29, 2013, pp. 1-16 (relevant pp. 1-16).

Huisman, David J., Final Office Action U.S. Appl. No. 11/923,709, The United States Patent and Trademark Office, Jan. 21, 2014, pp. 1-20 (relevant pp. 1-20).

Huisman, David J., Advisory Action, U.S. Appl. No. 11/923,709, The United States Patent and Trademark Office, Apr. 14, 2014, pp. 1-3 (relevant pp. 1-3).

Huisman, David J., Advisory Action, U.S. Appl. No. 11/923,709, The United States Patent and Trademark Office, May 7, 2014, pp. 1-3 (relevant pp. 1-3).

Huisman, David J., Non-Final Office Action, U.S. Appl. No. 11/923,709, The United States Patent and Trademark Office, Aug. 12, 2015, pp. 1-20 (relevant pp. 1-20).

Huisman, David J., Final Office Action, U.S. Appl. No. 11/923,709, The United States Patent and Trademark Office, Jan. 15, 2016, pp. 1-14 (relevant pp. 1-14).

Huisman, David J., Advisory Action, U.S. Appl. No. 11/923,709, The United States Patent and Trademark Office, Apr. 29, 2016, pp. 1-3 (relevant pp. 1-3).

Huisman, David J., Non-Final Office Action, U.S. Appl. No. 13/408,739, The United States Patent and Trademark Office, Jun. 15, 2012, pp. 1-24 (relevant pp. 1-24).

Huisman, David J., Final Office Action, U.S. Appl. No. 13/408,739, The United States Patent and Trademark Office, Jan. 22, 2013, pp. 1-21 (relevant pp. 1-21).

Huisman, David J., Non-Final Office Action, U.S. Appl. No. 13/408,739, The United States Patent and Trademark Office, Jul. 30, 2015, pp. 1-21 (relevant pp. 1-21).

Huisman, David J., Final Office Action, U.S. Appl. No. 13/408,739, The United States Patent and Trademark Office, Jan. 5, 2016, pp. 1-25 (relevant pp. 1-25).

Huisman, David J., Notice of Allowance, U.S. Appl. No. 13/408,739, The United States Patent and Trademark Office, Apr. 25, 2016, pp. 1-8 (relevant pp. 8).

Huisman, David J., Restriction Requirement, U.S. Appl. No. 11/923,709, The United States Patent and Trademark Office, Oct. 14, 2010, pp. 1-6 (relevant pp. 1-6).

BUFFERING INSTRUCTIONS OF A SINGLE BRANCH, BACKWARDS SHORT LOOP WITHIN A VIRTUAL LOOP BUFFER

PRIORITY APPLICATION

The present application is a continuation of and claims priority benefit from U.S. Pat. No. 9,395,995, filed Feb. 29, 2012, entitled "RETRIEVING INSTRUCTIONS OF A SINGLE BRANCH, BACKWARDS SHORT LOOP FROM A VIRTUAL LOOP BUFFER Retrieving Instructions of a Single Branch, Backwards Short Loop From a Virtual Loop Buffer," which is a continuation of application Ser. No. 11/923,709, entitled "Improving Fetching Efficiency of a Processor By Buffering Instructions of a Single Branch, Backwards Short Loop Within a Virtual Loop Buffer," filed on Oct. 25, 2007. Benefit of the priority date from the first-filed '709 application is hereby claimed. The entire content of both prior applications is hereby incorporated by reference herein.

BACKGROUND

1. Technical Field

The present invention generally relates to microprocessors and in particular to a technique for enhancing operations within a microprocessor.

2. Description of the Related Art

A microprocessor is a digital device that executes instructions specified by a computer program. A typical computer system includes a microprocessor coupled to a system memory that stores program instructions and data to be processed by the program instructions. One of the primary steps in executing instructions in a microprocessor involves fetching instructions from a cache. The majority of microprocessors possess caches which store instructions and allow rapid fetching of those instructions without having to access the main memory. As microprocessors become smaller and faster there is a need to improve the efficiency of the instruction fetch.

Several problems exist with the current method of instruction fetch from the instruction cache of a microprocessor. As an example, backward taken branch loops such as "for" loops and "while" loops, are common short loop constructs that frequent the instruction cache (I-cache). The for loop allows code to be executed repeatedly, often executing for a definite number of loop counts. While loops, also executing repeatedly, are conditional and based on the outcome of a sequential instruction. For each of the backward taken branch loop commands and the corresponding repeats, the I-cache is accessed repeatedly, even though the entire loop resides in the instruction buffer (IBUF).

Frequently accessing the I-cache with for and while loops, also known as short loops, increases device power consumption. As devices become smaller and more portable, lower power consumption is an important factor in microprocessor design. Repeated utilization of the I-cache for short loops increases energy consumption.

Repeated access to the I-cache for short loops may also cause instruction delays. For example, during an instruction fetch, delays may occur if the instruction cache is busy. Also the fetch logic must arbitrate to access the I-cache, whether there is one or multiple threads. In all these cases, increased latency can significantly degrade the efficiency of the microprocessor.

SUMMARY OF ILLUSTRATIVE EMBODIMENTS

Disclosed are a method and system for instruction fetching within a processor instruction unit, utilizing a loop buffer, one or more virtual loop buffers, and/or an instruction buffer. During instruction fetch, modified instruction buffers coupled to an instruction cache (I-cache) temporarily store instructions from a single branch, backwards short loop. The modified instruction buffers may be a loop buffer, one or more virtual loop buffers, and/or an instruction buffer. The instruction fetch within the instruction unit of a processor retrieves the instructions for the short loop from the modified buffers during the loop cycle, rather than from the instruction cache. Retrieving the instructions from the modified instruction buffers (a) reduces power usage (or energy consumption) by eliminating repeat accesses to the I-cache and (b) increases processor performance by freeing the I-cache for processing new instructions.

In one embodiment, a loop buffer is coupled to instruction buffers to store and retrieve instructions from a single branch, backwards short loop. The process may be performed in single thread mode or simultaneous multi-thread mode (SMT). The instruction loop is detected and analyzed to calculate the number of loops the instructions will cycle. After the instructions are loaded into the instruction buffer, the instruction fetch cycles through the loop buffer instead of the I-cache to obtain the instructions. When the cycle for the single branch, backwards short loop is complete the instruction fetch returns to processing data from the I-cache.

In one embodiment, the invention utilizes virtual loop buffers (VLB) to store instructions from a single branch, backwards short loop in single thread mode. Virtual loop buffers are added to instruction buffers coupled to an I-cache. When a single branch, backwards short loop is detected, if the number of instructions in the single branch, backwards short loop is less than or equal to the capacity of the VLB(s), the instructions in the single branch, backwards short loop are loaded into the instruction buffers. Once loaded into the instruction buffers, the instructions are distributed to the VLB(s). Instructions are fetched from the VLB(s) until all cycles within the loop are complete. In single thread mode, after completing the cycle, the instruction unit returns to performing the instruction fetch from the I-cache until another single branch, backwards short loop is detected.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
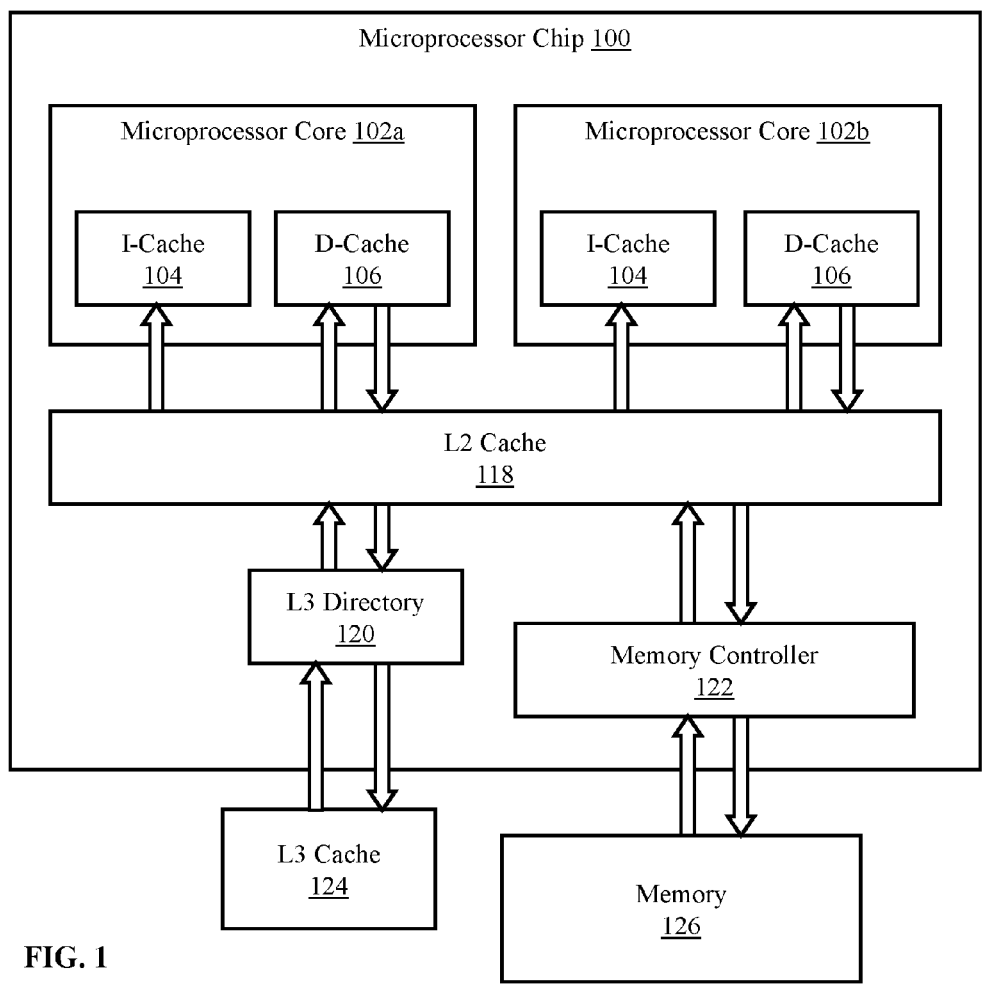
FIG. 1 is a block diagram of a microprocessor chip within a data processing system, according to one embodiment of the invention.

The illustrative embodiments provide a method and system for instruction fetching within a processor instruction unit, utilizing a loop buffer, one or more virtual loop buffers, and/or an instruction buffer. During instruction fetch, modified instruction buffers coupled to an instruction cache (I-cache) temporarily store instructions from a single branch, backwards short loop. The modified instruction buffers may be a loop buffer, one or more virtual loop buffers, and/or an instruction buffer. The instruction fetch within the instruction unit of a processor retrieves the instructions for the short loop from the modified buffers during the loop cycles, rather than from the instruction cache.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of a microprocessor chip within a data processing system 150. Microprocessor chip 100 comprises microprocessor cores 102a, 102b. Microprocessor cores 102a, 102b utilize instruction cache (I-cache) 104 and data cache (D-cache) 106 as a buffer memory between external memory and microprocessor cores 102a, 102b. I-cache 104 and D-cache 106 are level 1 (L1) caches, which are coupled to share level 2 (L2) cache 118. L2 cache 118 operates as a memory cache, external to microprocessor cores 102a, 102b. L2 cache 118 is coupled to memory controller 122. Memory controller 122 is configured to manage the transfer of data between L2 cache 118 and main memory 126. Microprocessor chip 100 may also include level 3 (L3) directory 120. L3 directory 120 provides on chip access to off chip L3 cache 124. L3 cache 124 may be additional dynamic random access memory.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention.

Figure 2:
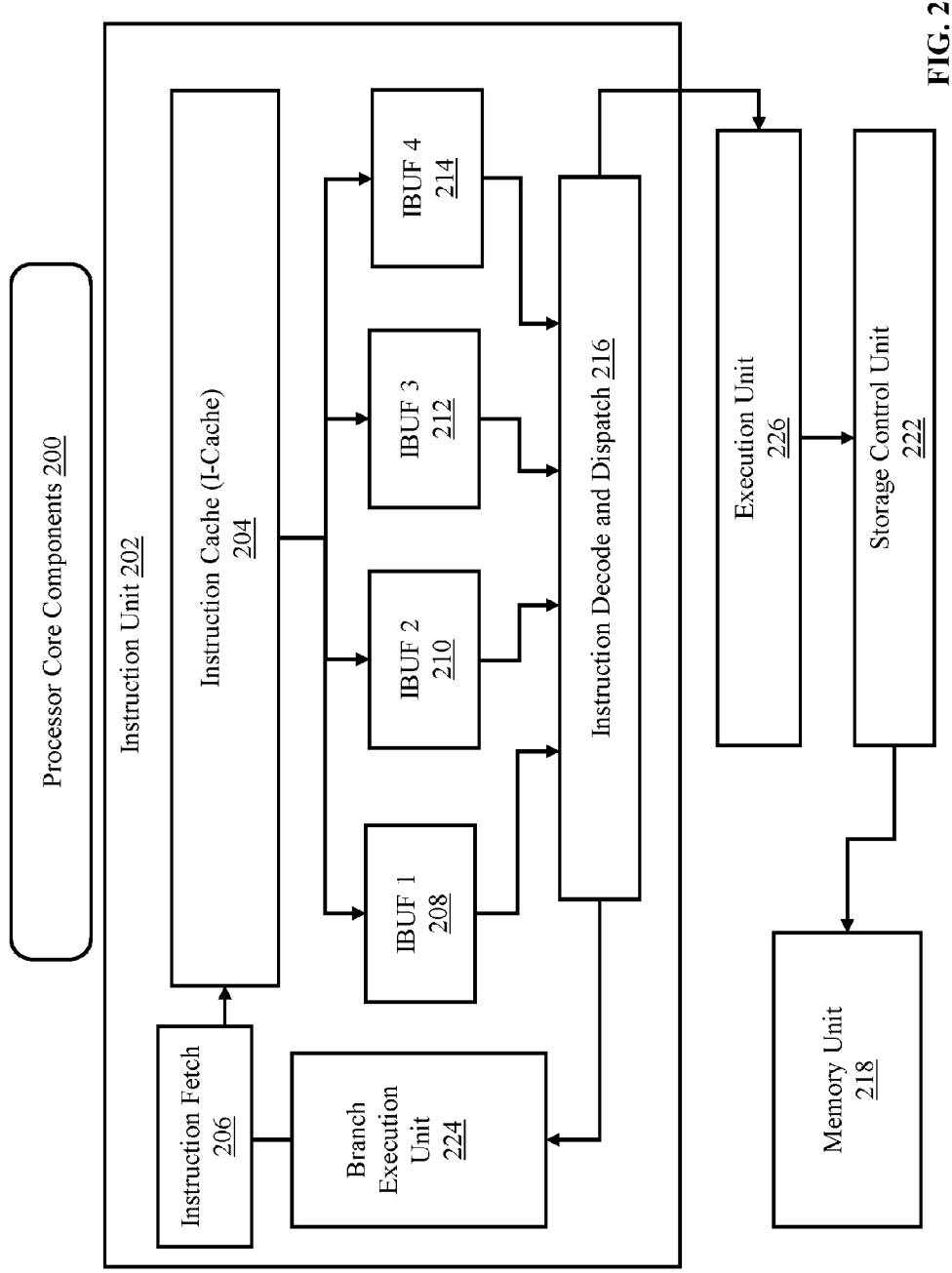
FIG. 2 is a block diagram of microprocessor components in accordance with one embodiment of the invention.

With reference now to FIG. 2, there are illustrated the major functional components of microprocessor chip 100 utilized in instruction fetching. In the described embodiments, microprocessor cores 102a, 102b (FIG. 1) serve as the primary processing units in microprocessor chip 100.

Instruction fetching is controlled by instruction unit 202. Instruction unit 202 comprises branch execution unit (BEU) 224 which utilizes instruction fetch 206 to initially obtain instructions from I-cache 204. I-cache 204 resides in the instruction unit 202 of processor core 200. The fetched instructions are placed in IBUF 1 208, IBUF 2 210, IBUF 3 212, or IBUF 4 214. Instructions from I-cache 204 are temporarily saved in IBUF 1 208, IBUF 2 210, IBUF 3 212, and IBUF 4 214 before being decoded at instruction decode and dispatch (IDD) 216. Instructions are retrieved from IDD 216 and sent to execution unit 226. Processed instructions are transmitted to storage control unit 222 and then to memory unit 218. In conventional processing, when utilizing IBUF 1 208, IBUF 2 210, IBUF 3 212, or IBUF 4 214 during a loop cycle, instructions are repeatedly fetched from I-cache 204.

Instruction unit 202 may be utilized in simultaneous multi-thread (SMT) mode or single thread mode. A thread is a single sequential flow of control within an instruction set, or program. Programs may have multiple threads and thereby multiple sequential flows of control. When multiple threads are utilized, multiple processes can take place within one cycle. In single thread mode, programs have a single sequential flow of control. However, a single thread is capable of working on a second task when idled by a previous task.

In one embodiment instruction fetch 206 may simultaneously cycle multiple threads or a single thread through I-cache 204. During instruction cycling, a backwards short loop is detected with no further instruction branches within the loop. Detection may be done by utilizing a branch target address cache to identify the single branch, backwards short loop. To bypass repeat fetching of instructions from I-cache 204 during SMT mode or single thread mode cycling, an additional buffer is added to the instruction buffers within instruction unit 202.

Figure 3:
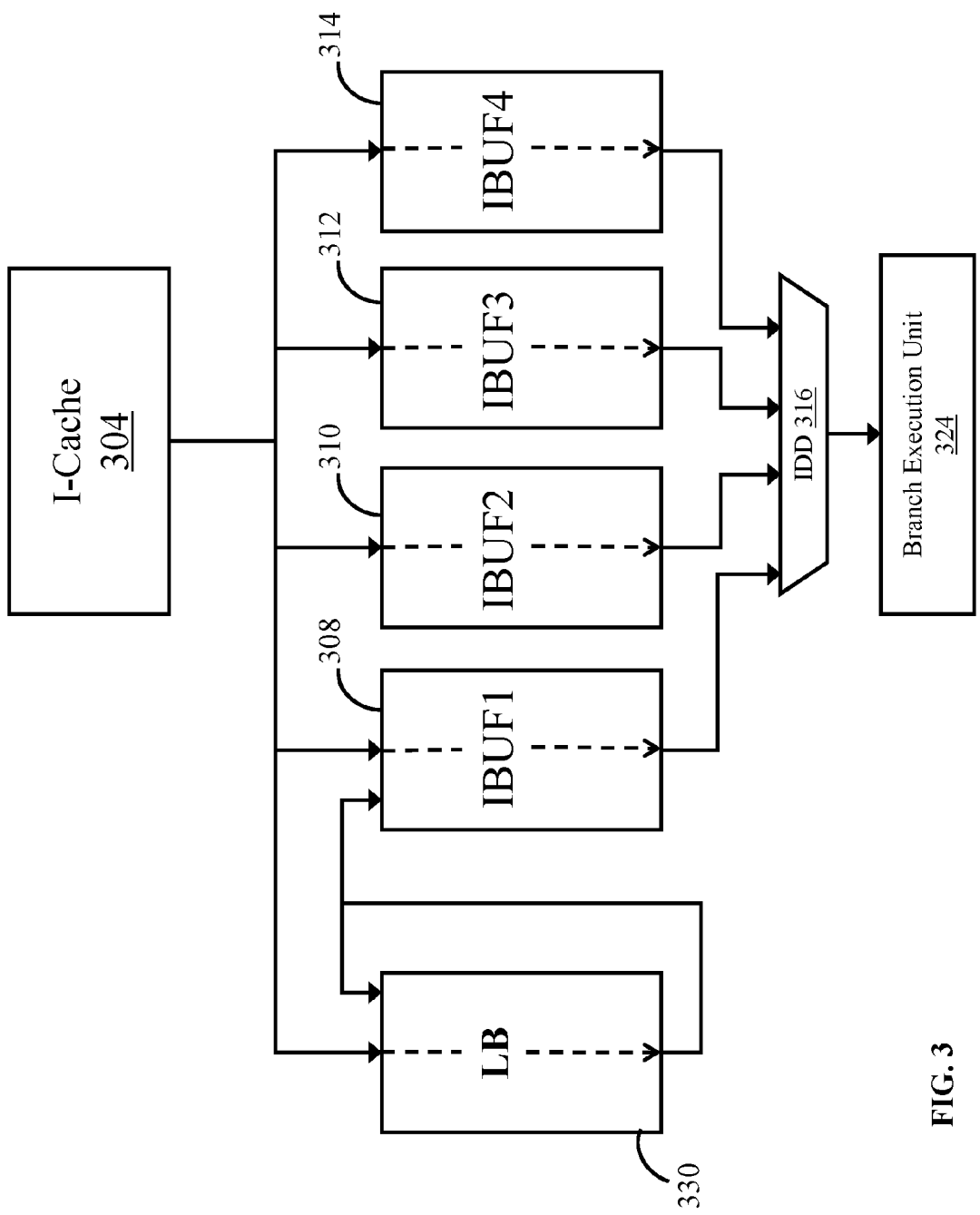
FIG. 3 is a diagram depicting instruction buffer enhancement with a loop buffer according to one embodiment of the invention.

FIG. 3 illustrates an example I-cache 304, with loop buffer 330, as well as instruction buffers IBUF 1 308, IBUF 2 310, IBUF 3 312, and IBUF 4 314. IDD 316 and branch execution unit 324 assist in processing the instructions after the instructions exit from the IBUFs. In one embodiment, loop buffer 330 is added to process single branch, backwards short loop instructions in single thread or SMT mode. A single branch, backwards short loop enters I-cache 304. Loop buffer (LB) 330 temporarily stores the backwards short loop during instruction cycling. Then, instead of repeat access to I-cache 304, loop buffer 330 is accessed until the loop cycle is complete. Accessing loop buffer 330 for the loop cycle enables I-cache 304 to be available to process new instruction threads. Upon completion of the loop cycle, processing continues to IDD 316 and/or resumes instruction fetch from I-cache 304.

In one embodiment, the number of instructions of the single branch, backwards short loop cycling from I-cache 304 is greater than the capacity of loop buffer 330. When the number of instructions of the single branch, backwards short loop exceeds the capacity of LB 330, then IBUF 1 308, IBUF 2 310, IBUF 3 312, and/or IBUF 4 314 are utilized to assist in storing the loop instructions. Upon completion of the loop, instruction fetch 206 in FIG. 2 resumes processing instructions from I-cache 304.

In one embodiment, during single thread mode, a backwards short loop containing no further branches within the loop is detected. As provided by FIG. 4, two virtual loop buffers (VLB) 430 are added to instruction buffers IBUF 1 408, IBUF 2 410, IBUF 3 412, and IBUF 4 414. The backwards short loop instructions are distributed across VLB 430 from IBUF 1 408, IBUF 2 410, IBUF 3 412, and IBUF 4 414. The number of instruction buffers utilized during the cycle is contingent on the number of instructions within the loop. IDD 416 and branch execution unit 424 assist in processing the instructions after the instructions exit from the IBUFs. The single branch backwards short loop cycles through I-cache 404 and into IBUF 1 408, IBUF 2 410, IBUF 3 412, and IBUF 4 414. In the illustrative embodiments, the virtual loop buffers may store thirty-two lines of instructions (four instructions per VLB, with each of four instruction buffers comprising two VLBs). The length of the single branch, backwards short loop may not exceed the capacity of VLBs 430. VLB 430 is repeatedly accessed for the duration of the loop cycles. While the loop cycles are ongoing, I-cache 404 may be turned off or used to store new instructions.

Figure 5:
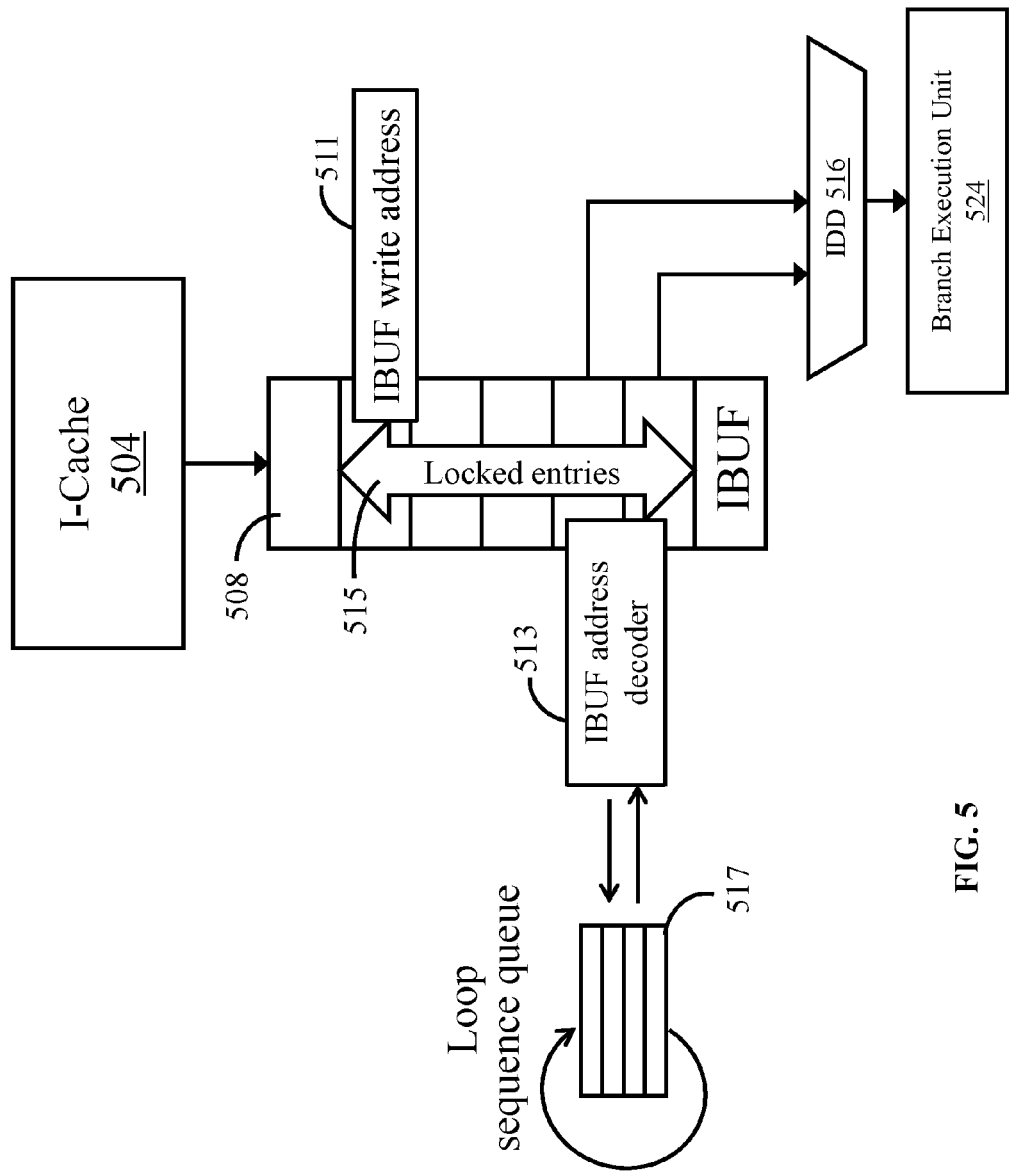
FIG. 5 is a diagram depicting instruction buffer enhancement utilizing a loop sequence queue according to one embodiment of the invention.

FIG. 5 illustrates one embodiment in which I-cache 504 is coupled to a single instruction buffer (IBUF) 508. IDD 516 and branch execution unit 524 assist in processing the instructions after the instructions exit from IBUF 508. Instruction addresses are written to IBUF 508 at IBUF write 511, the address entries are locked in to IBUF 508 with locked entry 515. The instructions may be decoded (via IBUF address decoder 513) and sent to loop sequence queue 517. During single thread mode, a backwards short loop containing no further branches within the loop is detected. IBUF 508 is loaded with instructions from the loop, and loop sequence queue 517 captures the address and sequence of the loop instructions. IDD 516 selects instructions from IBUF 508 as indexed by loop sequence 517. Loop sequence queue 517 continues rotating until the last instruction within the loop has been encountered.

Figure 6:
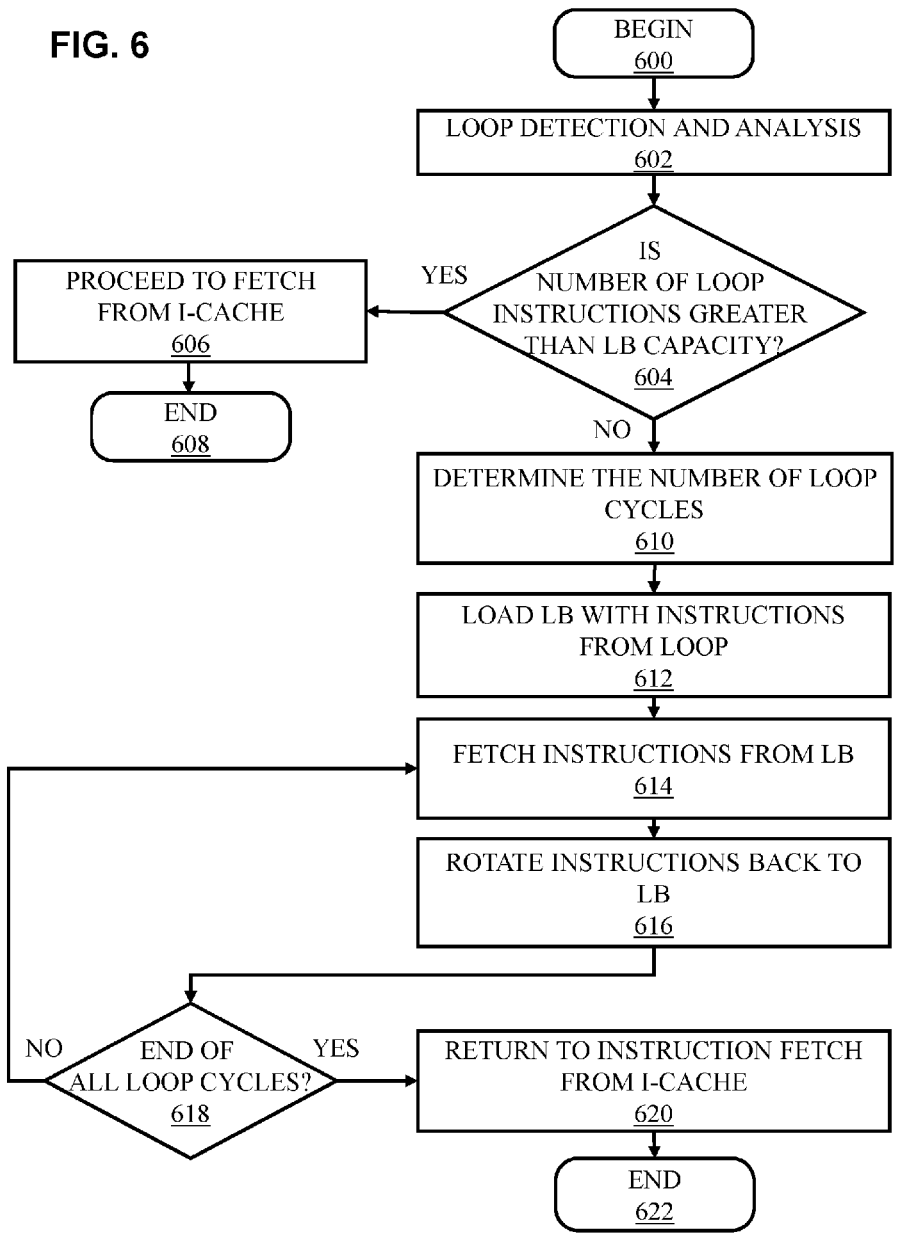
FIG. 6 is a logic flow chart of the process of short loop instruction buffer enhancement utilizing a loop buffer in accordance with one embodiment of the invention.
Figure 7:
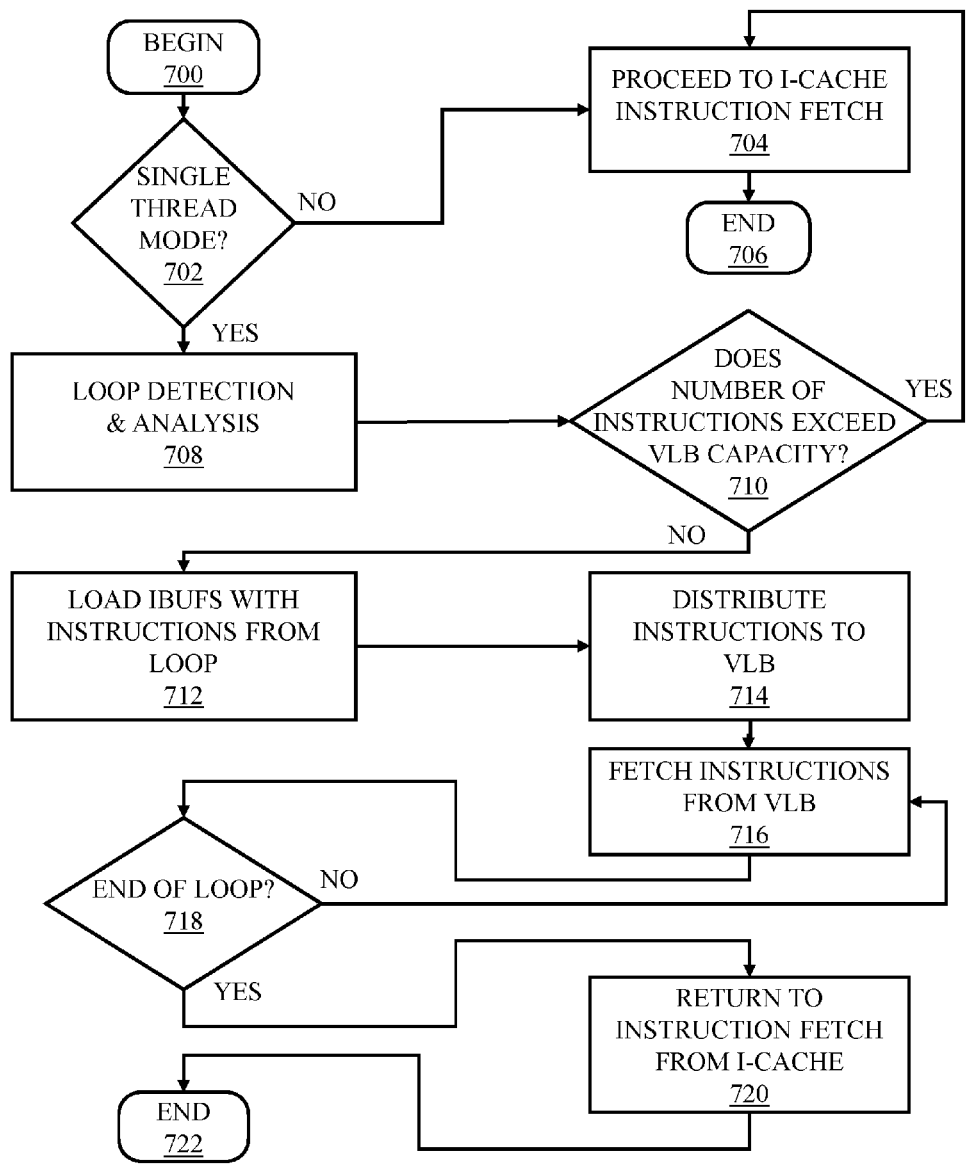
FIG. 7 is a logic flow chart of the process of short loop instruction buffer enhancement utilizing virtual loop buffers according to one embodiment of the invention.
Figure 8:
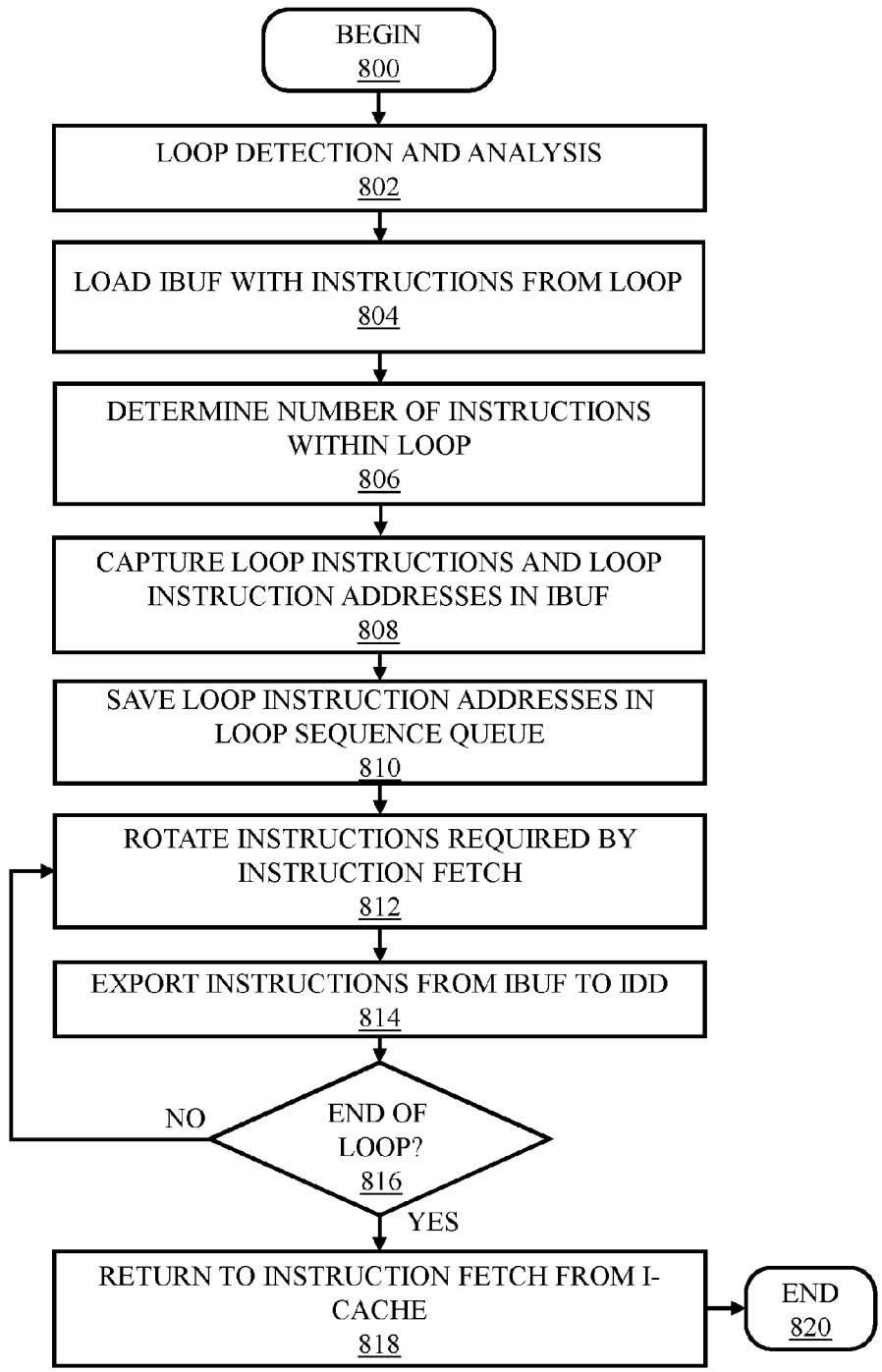
FIG. 8 is a logic flow chart of the process of short loop instruction buffer enhancement utilizing a register file instruction loop buffer in accordance with one embodiment of the invention.

FIGS. 6-8 are flow charts illustrating various methods by which the above processes of the illustrative embodiments are completed. Specifically, the method of FIG. 6 relates to the configuration provided by FIG. 3, the method of FIG. 7 relates to the configuration provided by FIG. 4, and the method of FIG. 8 relates to the configuration provided by FIG. 5. Although the methods illustrated in FIGS. 6-8 may be described with reference to components shown in respective FIGS. 3-5, it should be understood that this is merely for convenience and alternate components and/or configurations thereof can be employed when implementing the various methods.

The process of FIG. 6 begins at initiator block 600 when a single branch, backwards short loop is cycled through I-cache 304 (FIG. 3). The loop is detected and analyzed at block 602. A decision is made at block 604 whether the number of instructions of the single branch, backwards short loop is greater than the capacity of loop buffer 330 (FIG. 3). If the number of instructions is greater than the loop buffer capacity, then the instruction fetch proceeds to fetch instructions for the loop cycle utilizing I-cache 304, as shown at block 606. Then, the process ends for this embodiment at block 608. If the number of instructions (i.e., the instruction length) is not greater than the capacity of LB 330, then the process proceeds to block 610.

At block 610 the number of loop cycles is determined. The single branch, backwards short loop is then loaded into LB 330 at block 612. After LB 330 is loaded with the instructions for the loop, the logic/utility proceeds to access LB 330 instead of the I-cache 304 for the loop instructions, at block 614. At block 616, the IDD rotates instructions processed from LB 330 back to LB 330. A decision is made at block 618 whether the end of all loop cycles has been reached. If all cycles of the loop have not been completed, the process returns to block 614 to fetch the instructions from LB 330. When all loop cycles have completed, the fetch instructions logic/utility returns to fetching instructions from I-cache 304, freeing LB 330 for the next single branch, backwards short loop sequence. The process ends at block 622.

Figure 4:
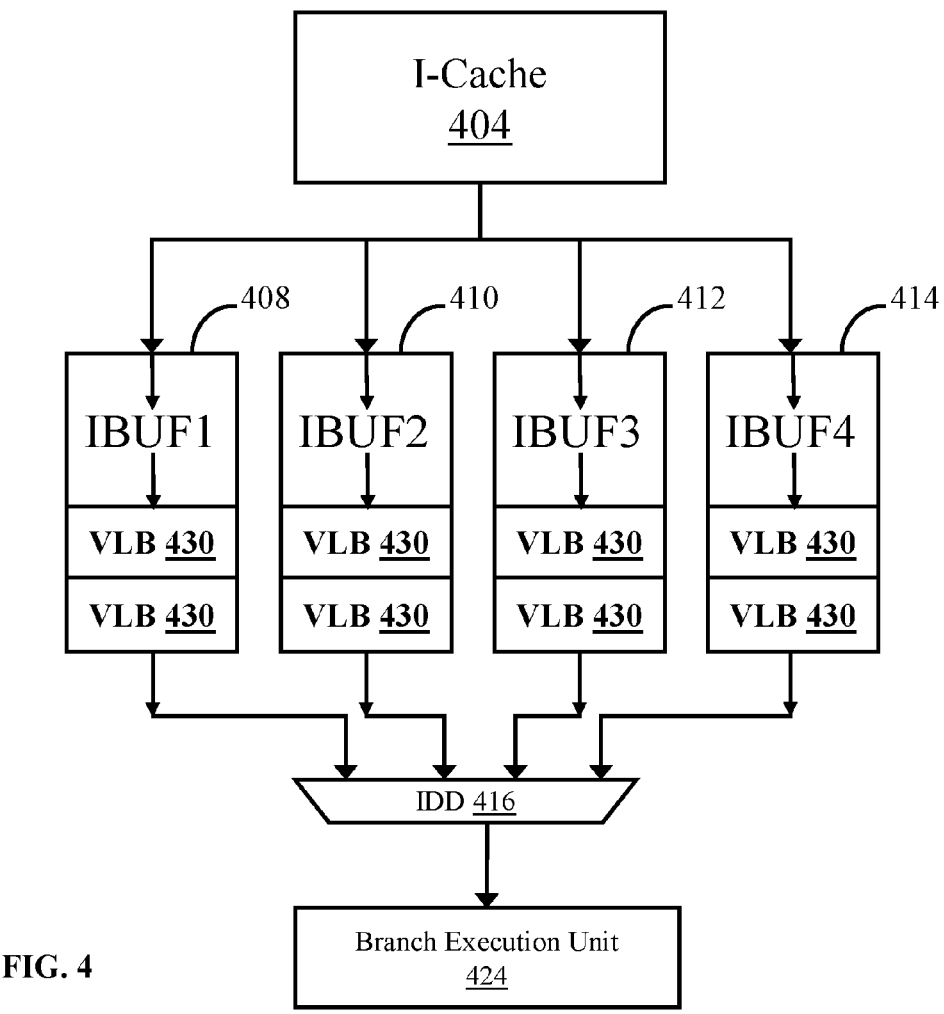
FIG. 4 is a diagram depicting instruction buffer enhancement with virtual loop buffers in accordance with one embodiment of the invention.

The FIG. 7 flow chart begins with block 700, where virtual loop buffers, such as VLB 430 (FIG. 4) are utilized to reduce the amount of instructions fetched from I-cache 404 (FIG. 4). At block 702 a decision is made, whether the current mode of instruction cycling is single thread. If the mode is not single thread, the instruction fetch process completes instruction fetch from I-cache 404, as shown at block 704, and the process ends at block 706.

If, at block 702, a determination is made that the mode is single thread, the process continues to block 708 where the single branch, backwards short loop is detected and analyzed. At block 710 a decision is made whether the number of instructions in the single branch, backwards short loop exceeds the capacity of VLB 430. If the number of instructions exceeds the capacity of VLB 430, the process proceeds to block 704, which indicates that the instruction fetch is completed from I-cache 404. If the number of instructions is less than or equal to the capacity of VLB 430, then the IBUFs are loaded with the instructions at block 712.

At block 714, after the IBUFs are loaded with the instructions, the instructions are distributed to VLB 430 in each IBUF. The instructions are fetched by IDD from VLB 430 at block 716. A decision is made at block 718 whether the end of the loop has been reached (i.e., all cycles of the loop have completed). If the end of the loop has not been reached, the process returns to block 716, which shows that the instructions are fetched from VLB 430. When the end of the loop has been reached, the instruction fetch process returns to completing instruction fetch from I-cache 404, as shown at block 720. The process ends at block 722.

The process of FIG. 8 begins at initiator block 800 after a single branch, backwards short loop is cycled through I-cache 504 (FIG. 5). The loop is detected and analyzed at block 802. At block 804, the instructions in the single branch, backwards short loop are loaded into IBUF 508. The process continues to block 806 at which the number of instructions within the loop is determined. At step 808, the loop instructions and loop instruction addresses are captured to IBUF 508. The instruction addresses are saved in loop sequence queue 517, at step 810. At step 812, loop sequence queue 517 rotates the loop instructions as required by the instruction fetch. Instructions are exported to IDD 516, at step 814. A decision is made at step 816, whether the end of the loop has been reached. If instructions remain in the loop, the process returns to block 812, where the loop sequence queue 517 continues to rotate the instructions. If the end of the loop has been reached, the process returns to instruction fetch from I-cache 504, at step 818. The process ends at step 820.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Generally, retrieving the instructions from the modified instruction buffers (a) reduces power usage (or energy consumption) by eliminating repeat accesses to the I-cache and (b) increases processor performance by freeing the I-cache for processing new instructions.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non-exclusive list of types of media, includes recordable type (tangible) media such as floppy disks, thumb drives, hard disk drives, CD ROMs, DVDs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A processor comprising:
   one or more execution units;
   an instruction cache having instructions stored therein for execution by the one or more execution units; and
   an instruction unit circuit coupled to the one or more execution units and which provides instructions fetched from the instruction cache to the one or more execution units for execution, wherein the instruction unit circuit comprises a plurality of physical instruction buffers, and wherein the instruction unit circuit is configured to:
   detect a presence of a single branch, backwards short loop within a stream of fetched instructions;
   add a plurality of virtual loop buffer subdivisions to each of the plurality of physical instruction buffers;
   create a virtual loop buffer that is physically distributed substantially equally across the plurality of virtual loop buffer subdivisions;
   determine whether the number of instructions in the single branch, backwards short loop is greater than the capacity of the virtual loop buffer; and
   in response to determining that the number of instructions in the single branch, backwards short loop is not greater than the capacity of the virtual loop buffer, temporarily buffer the single branch, backwards short loop in the virtual loop buffer, wherein the instructions of the single branch, backwards short loop are distributed substantially equally across each virtual loop buffer subdivision based on the number of instructions in the single branch, backwards short loop.

2. The processor of claim 1, wherein the instruction unit circuit is further configured to:
   determine a number of loop cycles of the single branch, backwards short loop; and
   retrieve the instructions of the single branch, backwards short loop from the virtual loop buffer and bypassing the instruction cache until all of the loop cycles of the single branch, backwards short loop have completed.

3. The processor of claim 1, wherein the instruction unit circuit is further configured to:
   in response to determining that the number of instructions in the single branch, backwards short loop is greater than the capacity of the virtual loop buffer, retrieve the instructions of the single branch, backwards short loop from the instruction cache.

4. The processor of claim 1, further comprising:
an instruction fetch unit that fetches instructions from the instruction cache; and
an instruction decode and dispatch unit that forwards instructions from the plurality of physical instruction buffers to the one or more execution units.

5. The processor of claim 1, wherein the plurality of physical instruction buffers includes four physical instruction buffers.

6. The processor of claim 1, wherein each virtual loop buffer subdivision is capable of storing four instructions.

7. The processor of claim 1, wherein each of the plurality of physical instruction buffers includes two virtual loop buffer subdivisions.

8. The processor of claim 1, wherein a portion of each of the plurality of physical instruction buffers is not allocated to a virtual loop buffer subdivision.

9. The processor of claim 1, further comprising:
a local loop buffer that is separate from the plurality of physical instruction buffers and is coupled to the instruction cache;
wherein the instruction unit circuit is configured to:
in response to detecting the presence of a single branch, backwards short loop within a stream of fetched instructions, determine whether the number of instructions in the single branch, backwards short loop is greater than the capacity of the local loop buffer;
wherein the single branch, backwards short loop does not contain any other branches, wherein the plurality of virtual loop buffer subdivisions are added to each of the plurality of physical instruction buffers in response to the instruction unit circuit determining the number of instructions in the single branch, backwards short loop is greater than the capacity of the local loop buffer.

10. The processor of claim 9, wherein the instruction unit circuit is further configured to:
in response to determining the number of instructions in the single branch, backwards short loop is not greater than the capacity of the local loop buffer, load the instructions of the single branch, backwards short loop into the local loop buffer; and
subsequently fetch the instructions of the single branch, backwards short loop from the local loop buffer during subsequent instruction processing for all loop cycles of the single branch, backwards short loop.

11. In a processor having one or more execution units, an instruction cache having instructions stored therein for execution by the one or more execution units, and an instruction unit comprising a plurality of physical instruction buffers and which is coupled to the one or more execution units and which provides instructions fetched from the instruction cache to the one or more execution units for execution, a method comprising:
detecting a presence of a single branch, backwards short loop within a stream of fetched instructions;
adding a plurality of virtual loop buffer subdivisions to each of the plurality of physical instruction buffers;
creating a virtual loop buffer that is physically distributed substantially equally across the plurality of virtual loop buffer subdivisions;
determining whether the number of instructions in the single branch, backwards short loop is greater than the capacity of the virtual loop buffer; and in response to determining that the number of instructions in the single branch, backwards short loop is not greater than the capacity of the virtual loop buffer, temporarily buffering the single branch, backwards short loop in the virtual loop buffer, wherein the instructions of the single branch, backwards short loop are distributed substantially equally across each virtual loop buffer subdivision based on the number of instructions in the single branch, backwards short loop.

12. The method of claim 11, further comprising:
determining a number of loop cycles of the single branch, backwards short loop; and
retrieving the instructions of the single branch, backwards short loop from the virtual loop buffer and bypassing the instruction cache until all of the loop cycles of the single branch, backwards short loop have completed.

13. The method of claim 11, further comprising:
in response to determining that the number of instructions in the single branch, backwards short loop is greater than the capacity of the virtual loop buffer, retrieving the instructions of the single branch, backwards short loop from the instruction cache.

14. The method of claim 11, further comprising:
fetching instructions from the instruction cache via an instruction fetch unit; and
forwarding, via an instruction decode and dispatch unit, instructions from the plurality of physical instruction buffers to the one or more execution units.

15. The method of claim 11, wherein the plurality of physical instruction buffers includes four physical instruction buffers.

16. The method of claim 11, wherein each virtual loop buffer subdivision is capable of storing four instructions.

17. The method of claim 11, wherein each of the plurality of physical instruction buffers includes two virtual loop buffer subdivisions.

18. The method of claim 11, wherein a portion of each of the plurality of physical instruction buffers is not allocated to a virtual loop buffer subdivision.

19. The method of claim 11, wherein the processor further comprises a local loop buffer that is separate from the plurality of physical instruction buffers and is coupled to the instruction cache, the method further comprising:
in response to detecting the presence of a single branch, backwards short loop within a stream of fetched instructions, determining whether the number of instructions in the single branch, backwards short loop is greater than the capacity of the local loop buffer;
wherein the single branch, backwards short loop does not contain any other branches, wherein the plurality of virtual loop buffer subdivisions are added to each of the plurality of physical instruction buffers in response to determining the number of instructions in the single branch, backwards short loop is greater than the capacity of the local loop buffer.

20. The method of claim 19, further comprising:
in response to determining the number of instructions in the single branch, backwards short loop is not greater than the capacity of the local loop buffer, loading the instructions of the single branch, backwards short loop into the local loop buffer; and
subsequently fetching the instructions of the single branch, backwards short loop from the local loop buffer during subsequent instruction processing for all loop cycles of the single branch, backwards short loop.

* * * * *